US006160435A

United States Patent [19]

Kim

[11] Patent Number: 6,160,435

[45] Date of Patent: Dec. 12, 2000

[54] INTEGRATOR INPUT CIRCUIT

[75] Inventor: Min-Gyu Kim, Seoul, Rep. of Korea

[73] Assignee: Hyundai Electronics Industries Co., Ltd., Ichon-shi, Rep. of Korea

[21] Appl. No.: 09/237,227

[22] Filed: Jan. 26, 1999

[30] Foreign Application Priority Data

Aug. 13, 1998 [KR] Rep. of Korea ...................... 98-32900

[51] Int. Cl.[7] ........................................................ G06F 7/64

[52] U.S. Cl. .......................... 327/336; 327/103; 327/336; 327/345

[58] Field of Search .................................... 327/103, 132, 327/558, 73, 53, 345, 336, 344

[56] References Cited

U.S. PATENT DOCUMENTS 5,510,738 4/1996 Gorecki et al. ......................... 327/103
5,767,708 6/1998 Groeneveld et al. ................... 327/132

*Primary Examiner*—Tuan Lam
*Assistant Examiner*—Hiep Nguyen
*Attorney, Agent, or Firm*—Fleshner & Kim, LLP

[57] ABSTRACT

An integrator input circuit is disclosed. The circuit includes a voltage-current converting unit for converting a voltage into a current based on an amplifying and voltage dropping operation and outputting the thusly converted current, a current dividing unit for receiving an output current from the voltage-current converting unit and dividing the thusly received output current in a single form or multiple forms at a predetermined ratio, and an integrator for receiving the current in a single form or multiple forms and having a single input/output or a differential input/output for implementing an integrating operation, thereby implementing an integrator having a predetermined frequency bandwidth without adjusting a resistance or a capacitance by forming a current flowing path, by which the current from an output terminal of a voltage-current conversion unit converting an input voltage of an integrator into a current is divided at a predetermined ratio, and by inputting a part of the current into the integrator.

15 Claims, 4 Drawing Sheets

INTEGRATOR INPUT CIRCUIT

BACKGROUND OF THE INVENTION

1. Field of the Invention

The present invention relates to an integrator, and in particular to an improved integrator input circuit which is capable of adjusting a frequency bandwidth of an integrator by dividing a current at a predetermined ratio when converting an input voltage into a current and inputting a part of the current into the integrator.

2. Description of the Background Art

FIG. 1 illustrates a known integrator. As shown therein, the known integrator includes a computation amplifier "A" for amplifying an input voltage value, a feeding-back capacitor "C" connected between an input terminal and an output terminal of the computation amplifier "A", and a resistor "R" connected between the voltage input terminal and the computation amplifier "A".

FIG. 2 illustrates a frequency response characteristic of the integrator. The operation characteristic of the integrator will be explained with reference to FIG. 2.

First, the input current flowing from the input terminal of the integrator, to which an input voltage Vs is applied, to the resistor "R" may be expressed as $i_1=V_S/R$. In addition, the current flowing from the output terminal of the computation amplifier "A" to the capacitor "C" may be expressed as $i_c=C(dV_0/dt)$. Here, since current does not flow in the input terminal of the computation amplifier "A", an expression of $i_1=-i_C$ is obtained.

Therefore, the following equation is obtained.

$$\frac{V_s}{R}=-C\frac{dV_0}{dt} \qquad \text{(Equation 1)}$$

The output voltage $V_0$ may be expressed as follows by integrating the values of Equation 1.

$$V_0=-\frac{1}{RC}\int V_s dt \qquad \text{Equation 2}$$

Namely, the output voltage ($V_0$) from the integrator is changed to a type of a mathematical integration with respect to the input voltage (Vs) based on Equation 2.

In the known integrator, the integration coefficient is 1/RC, and a frequency bandwidth which is one of the major characteristics of the integrator, as shown in FIG. 2 is reverse proportional to the capacity of the resistor R or the capacitor C.

Therefore, in order to obtain a predetermined frequency bandwidth, the capacity of the resistor R or the capacitor C is adjusted. If a predetermined frequency bandwidth is required, the same is obtained by properly adjusting the capacity of the resistor R or the capacitor C. If a very low frequency bandwidth is required, the capacity of the resistor R or the capacitor C should be very large.

However, if the resistance value is too increased, the resistance with respect to noise is decreased, so that there is a limit for implementing an integrated circuit (IC). In addition, it is difficult to increase the capacitance in the IC, so that a capacitor and an external terminal are additionally used.

SUMMARY OF THE INVENTION

Accordingly, it is an object of the present invention to provide an integrator input circuit which overcomes the aforementioned problems encountered in the background art.

It is another object of the present invention to provide an integrator input circuit which is capable of implementing an integrator having a predetermined frequency bandwidth without adjusting a resistance or a capacitance by forming a current flowing path, by which the current from an output terminal of a voltage-current conversion unit converting an input voltage of an integrator into a current is divided at a predetermined ratio, and by inputting a part of the current into the integrator.

To achieve the above objects, there is provided an integrator input circuit which includes a voltage-current converting unit for converting a voltage into a current based on an amplifying and voltage dropping operation and outputting the thusly converted current, a current dividing unit for receiving an output current from the voltage-current converting unit and dividing the thusly received output current in a single form or multiple forms at a predetermined ratio, and an integrator for receiving the current in a single form or multiple forms and having a single input/output or a differential input/output for implementing an integrating operation.

Additional advantages, objects and features of the invention will become more apparent from the description which follows.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
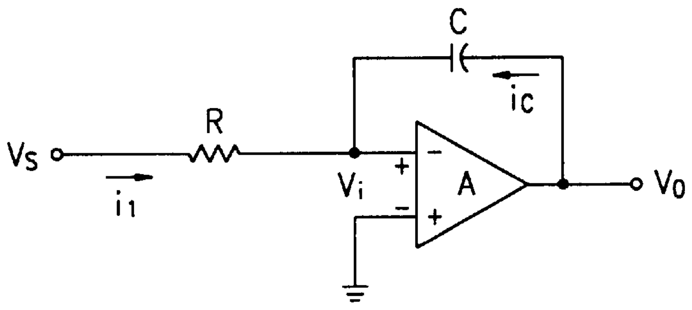
FIG. 1 CONVENTIONAL ART
FIG. 1 is a circuit diagram illustrating a known integrator.
Figure 2:
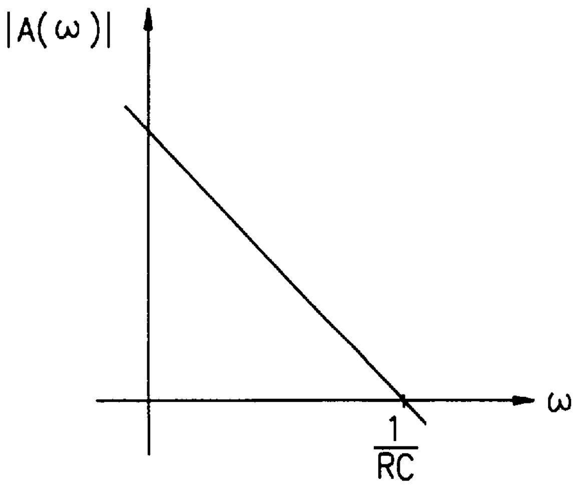
FIG. 2 CONVENTIONAL ART
FIG. 2 is a graph illustrating a frequency response of a known integrator.
Figure 3:
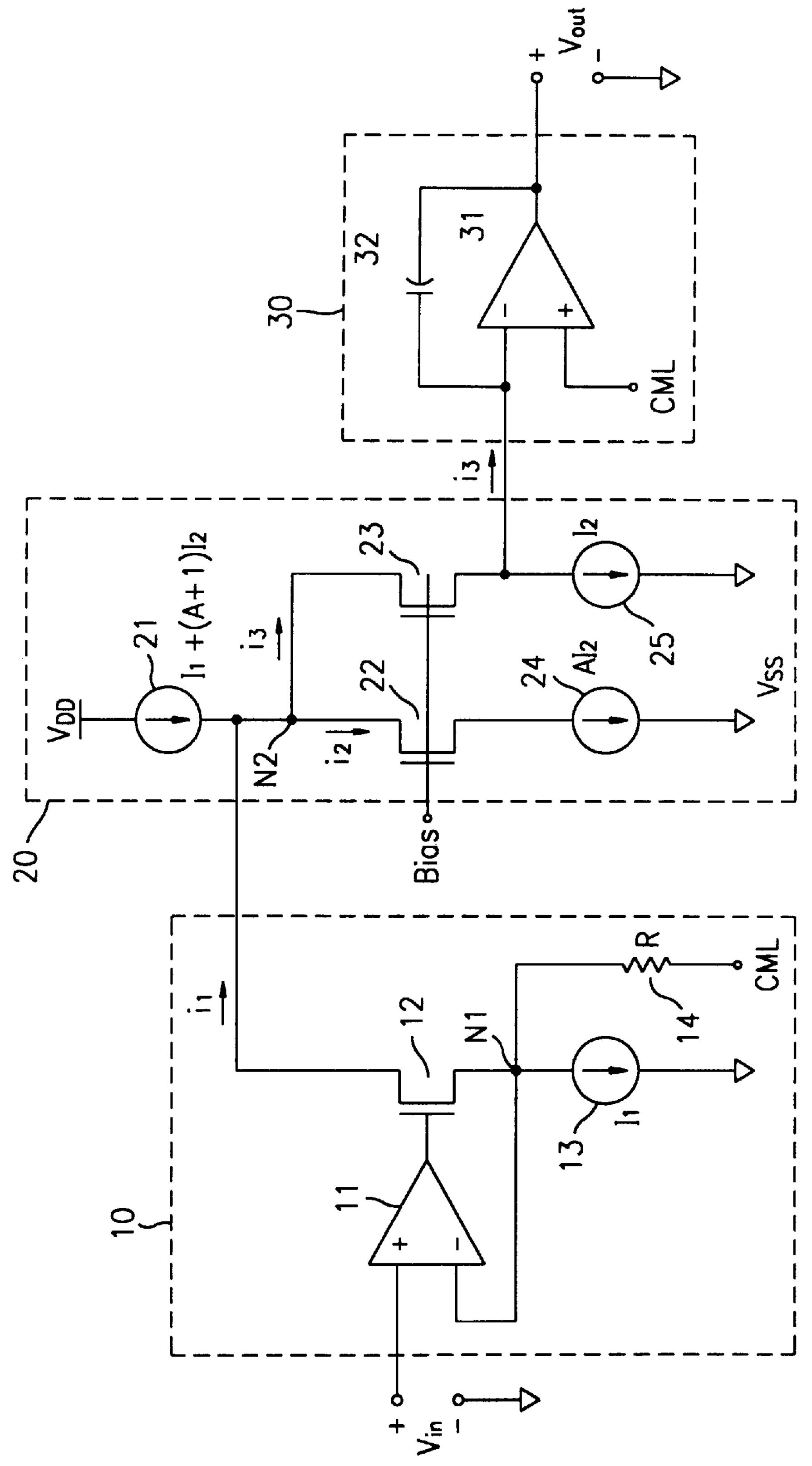
FIG. 3 is a circuit diagram illustrating an integrator input circuit having a single input/output according to the present invention.

FIG. 3 illustrates an integrator having a single input/output according to an embodiment of the present invention. As shown therein, there are provided a voltage-current converting unit 10, a current dividing unit 20, and an integrator 30.

The voltage-current converting unit 10 includes a computation amplifier 11 having its first node N1 connected with a negative (−) input terminal and receiving a voltage having the same magnitude as the voltage of a positive (+) input terminal, a resistor 14 connected between the first node N1 and a common level(CML which is generally $V_{DD}/2$), a first current source 13 connected between the first node N1 and a ground voltage $V_{SS}$, and a first NMOS transistor 12 a gate of which is connected with an output terminal of the computation amplifier 11, a source of which is connected with the first node N1, and a drain of which is connected with a current dividing unit 20 connected in the next circuit.

In addition, the current dividing unit 20 includes a second current source 21 connected with a system voltage $V_{DD}$, second and third NMOS transistors 22 and 23 the drains f which are connected with the second current source 21, respectively, and the gates of which receive a bias voltage, respectively, and third and fourth current sources 24 and 25 connected between the source sides of the second and third NMOS transistors 22 and 23 and the ground voltage $V_{SS}$.

The integrator 30 includes a computation amplifier 31 for amplifying the current from a source side node of the third NMOS transistor 23 of the current dividing unit 20, and a feed-back capacitor 32.

The operation of the integrator according to the present invention will be explained.

The static state current is shown in the current sources 13, 24 and 25 by the arrow in the drawings, and the current may be expressed as follows.

The current of the first current source 13: $I=I_1$

The current of the second current source 21: $I=I_1+(A+1)I_2$

The current of the third current source: $I=A\cdot I_2$

The current of the fourth current source: $I=I_2$

When the input voltage Vin is inputted into the computation amplifier 11 of the voltage-current converting unit 10, the voltage having a voltage identical to the input voltage Vin is applied to the first node N1, so that the voltage is dropped at both ends of the resistor 14 for thereby generating a current $i_1$.

In addition, the first NMOS transistor 12, a source follower, applies the output current $i_1$ from the source to the current dividing unit 20.

The current $i_1$ applied to the current dividing unit 20 is divided at a predetermined ratio, for example A:1, by the second node N2 and flows through the current flowing path formed in the next circuit. Namely, the currents $i_2$ and $i_3$ may be expressed as follows.

$$i_2 = \frac{A}{A+1}i_1,\ i_3 = \frac{1}{A+1}i_1 \qquad \text{Equation 3}$$

The currents $i_2$ and $i_3$ are applied to the drains of the second and third NMOS transistors 22 and 23, and the input terminal of the integrator 30 connected with the source side node of the third NMOS transistor 23 receives 1/A+1 of $i_1$.

Figure 4:
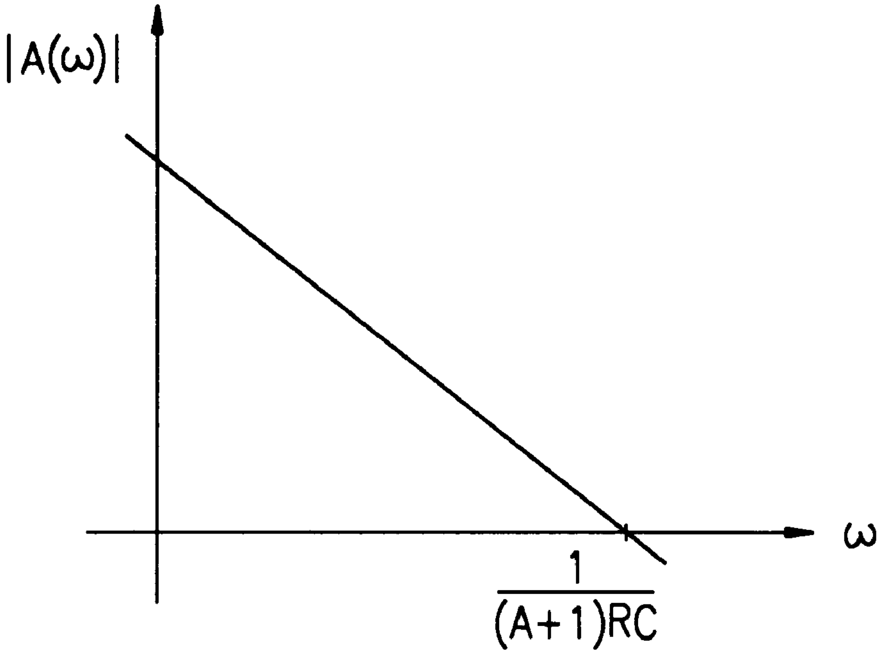
FIG. 4 is a graph illustrating a frequency response of an integrator according to the present invention.

Therefore, the conversion function of the integrator may be expressed as follows, so that the integrator having a frequency bandwidth as shown in FIG. 4 is implemented.

$$\frac{Vout(s)}{Vin(s)} = \frac{1}{s(A+1)RC} \qquad \text{Equation4}$$

Figure 5:
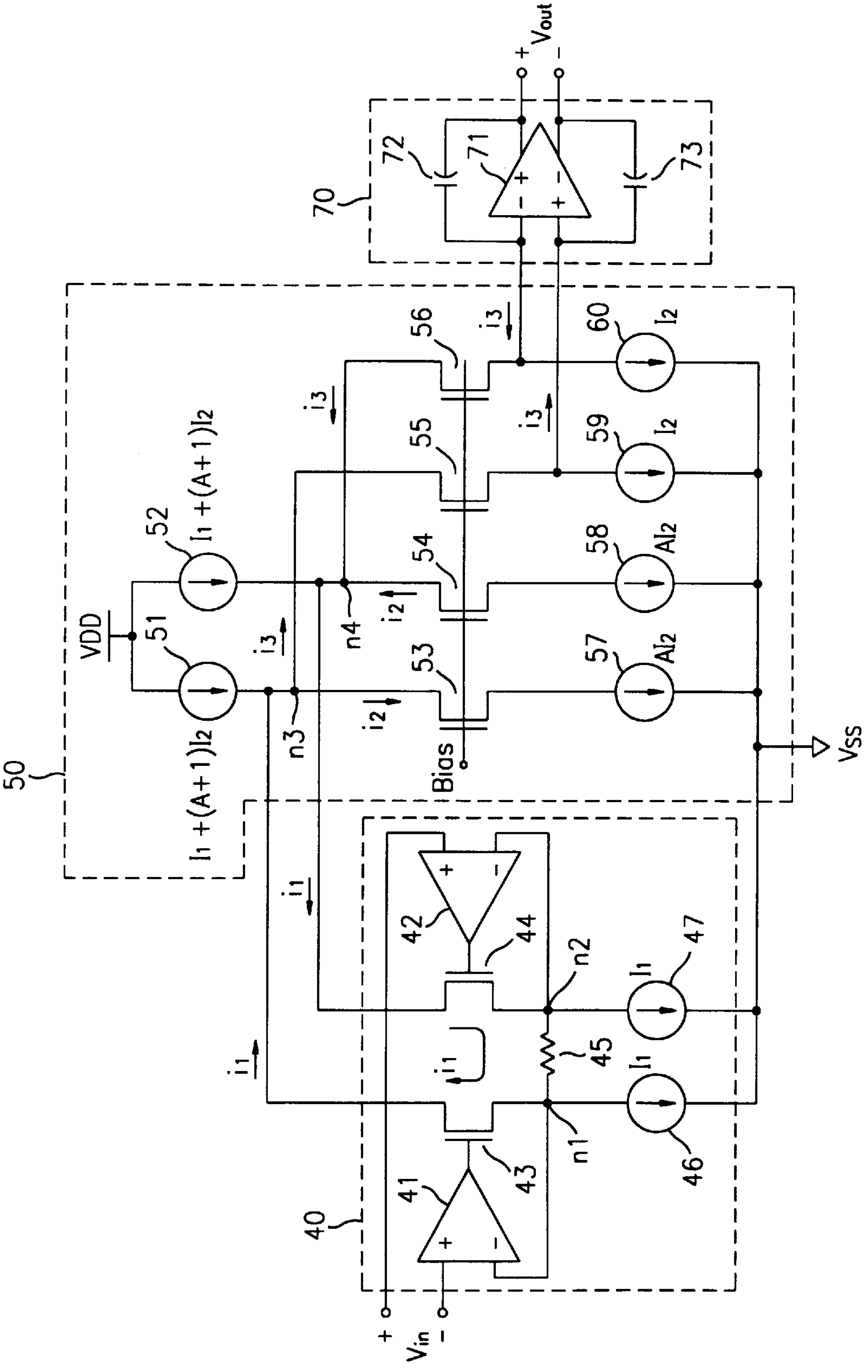
FIG. 5 is a circuit diagram illustrating an integrator input circuit having a differential input/output according to the present invention.

FIG. 5 illustrates an integrator having a differential input/output according to another embodiment of the present invention.

As shown therein, there are provided a voltage-current converting unit 40, a current dividing unit 50 and an integrator 70.

The voltage-current converting unit 40 includes first and second computation amplifiers 41 and 42 having their first and second nodes n1 and n2 having their position (+) input terminals receiving an input voltage Vin and their first and second nodes n1 and n2 connected with the negative (−) input terminal and receiving the same capacity and code as the input voltage, a resistor 45 connected between the first node n1 and the second node n2, first and second current sources 46 and 47 connected between the first and second nodes n1 and n2 and the ground voltage $V_{SS}$, and first and second NMOS transistors 43 and 44 the gates of which are connected with the output terminals of the first and second computation amplifiers 41 and 42, the sources of which are connected with the first and second nodes n1 and n2, and the drains of which are connected with the current dividing unit 50 of the next circuit.

The current dividing unit 50 includes third and fourth current sources 51 and 52 connected with a system voltage $V_{DD}$, respectively, third and fifth NMOS transistors 53 and 55 the drains of which are connected with a third current source 51, respectively, and the gates of which receive a bias voltage, fourth and sixth NMOS transistors 54 and 56 the gates of which receive the bias voltage, and fifth through eighth current sources 57, 58, 59 and 60 connected between the source sides of the third through sixth NMOS transistors 53, 54, 55 and 56 and the ground voltage $V_{SS}$.

In addition, the current dividing unit 50 includes third and fourth current sources 51 and 52 connected with the system voltage $V_{DD}$, respectively, third and fifth NMOS transistors 53 and 55 the drains of which are connected with the third current source 51, respectively, and the gates of which receive the bias voltage, fourth and sixth NMOS transistors 54 and 56 the drains of which are connected with the fourth current source 52, respectively, and the gates of which receive the bias voltage, and fifth through eighth current sources 57, 58, 59, and 60 connected between the source sides of the third through sixth NMOS transistors 53, 54, 55 and 56 and the ground voltage $V_{SS}$.

In addition, the integrator 70 includes a computation amplifier 71 for amplifying the current from the source side nodes of the fifth and sixth NMOS transistors 55 and 56 of the current dividing unit 50.

The operation of the integrator having a differential input/output according to the present invention will be explained.

The static current states are shown by the arrow in FIG. 5, and the current may be expressed as follows assuming that the dividing ratio by the current dividing unit 50 is A:1.

The currents of the first and second current sources 46 and 47: $I=I_1$

The currents of the third and fourth current sources 51 and 52: $I=I_1+(A+1)I_2$ The currents of the fifth and sixth current sources 53 and 54: $I=A\cdot I_2$ The currents of the seventh and eighth current sources 55 and 56: $I=I_2$ When the input voltage Vin is inputted into the first and second computation amplifiers 41 and 42 of the voltage-current converting unit 40, respectively, the voltage having the same capacity as the input voltage is applied to the first and second nodes n1 and n2, respectively, so that the voltage is dropped at both ends of the resistor 45 for thereby generating the current $i_1$.

At this time, the first NMOS transistor 43, the source follower, applies the output current $i_1$ to the current dividing unit 50.

The current $i_1$ applied to the current dividing unit 50 is divided at a predetermined ratio, for example A:1, by the third node n3, and flows through the current folowing path formed in the next circuit. Namely, the currents $i_2$ and $i_3$, as shown in FIG. 3, may be expressed as the following Equation 3.

$$i_2 = \frac{A}{A+1} i_1,\ i_3 = \frac{1}{A+1} i_1 \qquad \text{Equation 3}$$

The thusly divided two currents $i_2$ and $i_3$ are applied to the drains of the third and fifth NMOS transistors 53 and 55, and the input terminal of the integrator 70 connected with the source side node of the fifth NMOS transistor 55 receives 1/(A+1) of the input current $i_1$.

Therefore, the conversion function of the integrator has the identical bandwidth as shown in FIG. 4 based on the following Equation 4 like the integrator having a single input/output of FIG. 3.

$$\frac{Vout(s)}{Vin(s)} = \frac{1}{s(A+1)RC} \qquad \text{Equation4}$$

Therefore, in the integrator according to the present invention, it is possible to determine the bandwidth of the frequency by controlling the resistor R or the capacitance as well as the amount of the current.

As described above, in the present invention, it is possible to implement an integrator having a predetermined bandwidth by properly controlling the current ratio of the current dividing unit and decreasing the capacitance by 1/A+1 in a predeternmined bandwidth. In addition, it is possible to overcome the problems that the capacitor occupies most areas of the entire circuit when implementing an integrator having a low frequency bandwidth, and an externally connected capacitor is connected using an extended external terminal.

Although the preferred embodiment of the present invention have been disclosed for illustrative purposes, those skilled in the art will appreciate that various modifications, additions and substitutions are possible, without departing from the scope and spirit of the invention as recited in the accompanying claims.

What is claimed is:

1. An integrator circuit comprising:

a voltage-current converter that converts an input voltage to output a first current at a first node;

a current divider that divides the first current received at the first node from the voltage-current converter to a second current and a third current based on a prescribed ratio; and an integrator that performs an integration operation based on the third current received from the current divider, wherein said current divider includes:

first, second and third current sources and first and second transistors, said first transistor being coupled between said first and second current sources in series and said second transistor being coupled between said first and third current sources in series, and said first and second transistors being coupled to the first node for receiving the first current from the voltage-current converter and said second transistor is coupled to the integrator.

2. The integrator circuit of claim 1, wherein said third current equals (1/(A+1))*the first current when the prescribed ratio is A:1.

3. The integrator circuit of claim 1, wherein each of the first and second transistors includes first and second electrodes and a control electrode, the first electrode of the first and second transistors being coupled to the first current source and the first node, the second electrode of the first transistor being coupled to the second current source and the second electrode of the second transistor being coupled to the third current source and the integrator, and the control electrode of the first and second transistors being coupled for receiving a bias voltage.

4. The integrator circuit of claim 1, wherein said current divider further comprises fourth, fifth and sixth current sources and third and fourth transistors, said third transistor being coupled between the fourth and fifth current sources in series and said fourth transistor being coupled between the fourth and sixth current sources in series, and said fourth transistor being coupled to the integrator.

5. The integrator circuit of claim 4, wherein each of the first and second transistors includes first and second electrodes and a control electrode, the first electrode of the first and second transistors being coupled to the first current source and the first node, the second electrode of the first transistor being coupled to the second current source and the second electrode of the second transistor being coupled to the third current source and the integrator, and the control electrode of the first and second transistors being coupled for receiving a bias voltage.

6. The integrator circuit of claim 5, wherein each of the third and fourth transistors includes first and second electrodes and a control electrode, the first electrode of the third and fourth transistors being coupled to the fourth current source and the voltage-current divider, the second electrode of the third transistor being coupled to the fifth current source and the second electrode of the fourth transistor being coupled to the sixth current source and the integrator, and the control electrode of the third and fourth transistors being coupled for receiving the bias voltage.

7. The integrator circuit of claim 1, wherein said integrator comprises:

a computational amplifier having first and second input terminals and an output terminal, the first input terminal being coupled to the second transistor of the current divider; and a capacitor coupled between the first input terminal and the output terminal.

8. The integrator circuit of claim 4, wherein said integrator comprises:

a computational amplifier having first and second input terminals and first and second output terminals, the first input terminal being coupled to the second transistor and the second input terminal being coupled to the fourth transistor;

a first capacitor coupled between the first input terminal and the first output terminal; and a second capacitor coupled between the second input terminal and the second output terminal.

9. The integrator circuit of claim 1, wherein the voltage-current converter comprises:

a computational amplifier having first and second input terminals and an output terminal;

a fourth current source coupled to the first input terminal;

a resistor coupled to the first input terminal; and a third transistor coupled to the first input terminal, the output terminal and the first node.

10. The integrator circuit of claim 9, wherein said third transistor includes first and second electrodes and a control electrode, said first electrode being coupled to the first node, the second electrode being coupled to the first input terminal and the control electrode being coupled to the output terminal.

11. The integrator circuit of claim 4, wherein said wherein the voltage-current converter comprises:

a first computational amplifier having first and second input terminals and an output terminal;

a second computational amplifier having first and second input terminals and an output terminal;

a seventh current source coupled to the first input terminal of the first computational amplifier;

an eighth current source coupled to the input terminal of the second computational amplifier;

a fifth transistor coupled to the first input and output terminals of the first computational amplifier and the first node; and a sixth transistor coupled to the first input and output terminals of the second computational amplifier and the fourth current source.

12. The integrator circuit of claim 11, wherein a resistor is coupled to the seventh and eighth current sources and the fifth and sixth transistors.

13. The integrator circuit of claim 12, wherein each of the fifth and sixth transistors includes first and second electrodes and a control electrode, wherein a first electrode of the fifth transistor is coupled to the first node, the second electrode of the fifth transistor is coupled to the first input terminal of the first computational amplifier and the control electrode of the fifth transistor is coupled to the output terminal of the first computational amplifier, and the first electrode of the sixth transistor is coupled to the fourth current source and the third transistor, the second electrode of the sixth transistor is coupled to the first input terminal of the second computational amplifier and the control electrode of the sixth transistor is coupled to the output terminal of the second computational amplifier.

14. The integrator circuit of claim 13, wherein said first, second, and third transistors are NMOS transistors.

15. The integrator circuit of claim 11, wherein all of the transistors are NMOS transistors.

* * * * *